United States Patent [19]

Tresselt

[11] 4,425,567

[45] Jan. 10, 1984

[54] BEAM FORMING NETWORK FOR CIRCULAR ARRAY ANTENNAS

[75] Inventor: Carl P. Tresselt, Towson, Md.

[73] Assignee: The Bendix Corporation, Southfield, Mich.

[21] Appl. No.: 306,018

[22] Filed: Sep. 28, 1981

[51] Int. Cl.[3] .......................... H01Q 3/36; H01Q 3/40; G01S 1/14

[52] U.S. Cl. .................................................. 343/373

[58] Field of Search .................. 343/100 SA, 853, 854

[56] References Cited

U.S. PATENT DOCUMENTS 3,797,019 3/1974 Shestag et al. .................. 343/106 R 3,999,182 12/1976 Moeller et al. ............... 343/100 SA 4,163,974 8/1979 Profera ............................ 343/16 M

*Primary Examiner*—Eli Lieberman

*Attorney, Agent, or Firm*—W. G. Christoforo; Bruce L. Lamb

[57] ABSTRACT

A beam forming network for a circular array antenna includes a sum pattern network for generating signal weights corresponding to a sum antenna pattern having omnidirectional sidelobes and a difference pattern network for generating signal weights corresponding to a difference antenna pattern with omnidirectional sidelobes. Means are provided to couple energy from the difference pattern network to the sum pattern network. The signal weights are split by signal splitters and delivered in pairs to output terminals, one of which is terminated in its characteristic impedance.

7 Claims, 10 Drawing Figures

BEAM FORMING NETWORK FOR CIRCULAR ARRAY ANTENNAS

CROSS REFERENCE TO RELATED PATENT APPLICATION

This invention improves the beam forming network described in the copending U.S. patent application Ser. No. 90,836 filed Nov. 1, 1979, now U.S. Pat. No. 4,316,192 for "Beam Forming Network for Butler Matrix Fed Circular Array" by Joseph H. Acoraci which is assigned to the assignee of the present patent application.

BACKGROUND OF THE INVENTION

This invention relates to a multimode beam forming network for circular array radar antennas which provides back fill-in for the antenna pattern.

The above mentioned cross referenced related patent application describes a beam forming network which has particular use in an air traffic management system. Briefly, aircraft are generally equipped with transponders which are periodically interrogated by local ground stations. More particularly, the ground station transmits a coded interrogation message along a narrow rotating beam into its sphere of interest. An aircraft illuminated by the ground station beam, as the beam is rotated about the ground station as the center, decodes the coded interrogation message and responds with the requested information such as aircraft identification or altitude depending on the exact format of the coded interrogation message. By considering the instantaneous antenna beam pointing angle the ground station determines the azimuth of the responding aircraft and by timing the round-trip interrogation/response cycle the ground station determines slant range to the responding aircraft. Of course, as mentioned above, the response will include responding aircraft identity and altitude so that the ground station will be able to determine the positions of aircraft traffic within its sphere of interest.

The coding scheme used by the ground station not only is intended to elicit a response from an illuminated aircraft but also to ensure with a relatively high degree of certainty that aircraft which are not within the narrow beam do not respond to the interrogation message which might also be carried on the narrow beam side lobes. This is accomplished by the ground station transmitting one portion of the coded interrogation message, known as a P2 pulse in the art, on an omnidirectional beam, and by transmitting the remainder of the interrogation message on the narrow beam. An aircraft illuminated by the narrow beam will thus perceive the P2 pulse as relatively lower in amplitude than the remainder of the interrogation message, while an aircraft outside the narrow beam will perceive the P2 pulse as relatively higher in amplitude than the remainder of the same message. Each transponder's decoder is equipped to discern this distinction and will cause the transponder to respond when the P2 pulse is perceived to be lower but will cause the transponder to be temporarily suppressed so it will not respond when the P2 pulse is perceived higher in amplitude. As might be expected, this is quite important since an aircraft which responds to what can be termed a side lobe interrogation, that is, an interrogation not intended to be responded to by that aircraft, will incorrectly be perceived by the ground station as being on the instantaneous pointing azimuth of the narrow beam which, of course, that particular responding aircraft is not.

The method and means for implementing the above mentioned coding scheme of the prior art has certain faults, one of the most serious of which is the inability of the prior art ground station system to ensure that all aircraft not within the narrow beam are positively suppressed. Because of the antenna pattern side lobes an aircraft outside the narrow beam but within the ground station sphere of interest may fail to "hear" the interrogation message which, if it had heard it, it would have perceived as having a relatively high P2 pulse and thus would have suppressed itself. Thus, although the aircraft will not respond to that particular interrogation message, which of course it should not since it is outside the narrow beam, neither will it be suppressed. Normally the aircraft would have its transponder suppressed, that is, it would not respond during a short predetermined suppression period even though it may be illuminated by the proper interrogation message. This interrogation message which the aircraft might receive during its suppression period might, for example, be transmitted from a secnd, further removed, ground station whose sphere of interest should not extend into the sphere of interest of the first mentioned ground station, but which because of atmospheric or siting problems now does. It can be seen that should the aircraft respond to the interrogation from the second ground station the first station will interpret the response erroneously, that is, it will interpret that response as being indicative of an aircraft in the pointing direction of its narrow beam which, in this case, the responding aircraft is not. The ground station will also make an incorrect determination of slant range to the responding aircraft since it has correlated the interrogation/response cycle incorrectly.

The above problem was effectively solved by the beam forming network described in the above mentioned related patent application which included a back fill-in network to provide an interrogation message antenna beam pattern with an essentially true omnidirectional antenna pattern outside the narrow beam of the interrogation message. Thus, all aircraft outside the narrow beam described in the above mentioned patent application "hear" essentially all interrogations, perceiving a relatively high P2 pulse, so that they are suppressed constantly when outside the narrow beam and thus will not respond inadvertently. The above mentioned beam forming network, and more particularly azimuth beam forming network was composed of a back fill-in network which was essentially an omnidirectional network, a sum pattern network, a low sidelobe difference pattern network and a network for combining the patterns generated by the other networks in order to produce the desired sum and difference antenna patterns.

More particularly, the beam forming network of the above mentioned patent included N output terminals, one of which was terminated by its characteristic impedance, at which the weights corresponding to the desired sum and difference antenna patterns were generated. This was done by generating N/2 signal weights corresponding to a sum antenna pattern at a sum pattern network, splitting each signal in equal halves and delivering the split signals, in phase, respectively to pairs of output terminals. Since one output terminal was terminated by its characteristic impedance the weight at its associated output terminal corresponded to an omnidirectional antenna pattern. The zero order mode terminal was chosen as this latter terminal. Thus the weighted signals corresponding to a sum antenna pattern having omnidirectional sidelobes were generated. The same scheme was used to obtain the difference pattern weights from a difference pattern network except that the N/2 signals corresponding to a difference antenna pattern were split so that one split signal was 180° or nearly so out of phase with respect to the other split signal. In addition, power was coupled from the difference pattern network to the sum pattern network to provide weights corresponding to a cardioid-shaped antenna pattern which were superimposed on the difference pattern weights to generate weights corresponding to a difference antenna pattern having omnidirectional sidelobes. However, since during generation of the difference pattern weights signals were received at the output terminal corresponding to an omnidirectional antenna pattern from both the sum pattern network and the difference pattern network there was an undesirable skewing of the difference pattern weight from the desired 180° condition. In addition, since all signal weights were split equally by signal splitters in the form of 3 dB hybrids, including the weight corresponding to the zero phase shift omnidirectional antenna pattern, an excessive amount of signal energy was lost at the terminated terminal.

SUMMARY OF THE INVENTION

The present invention is an improvement over the above mentioned beam forming network which is characterized by an improvement in the undesirable difference pattern skew inherent in the prior network. In particular, the present invention is similar to the above described beam forming network except in the present invention the sum signal which feeds the signal splitter servicing both the terminted output and the omnidirectional antenna pattern terminals is derived from a directional coupler at the sum pattern network input terminal and as such is not coupled to the difference pattern network input terminal. This, of course, allows the weighted signal corresponding to the omnidirectional antenna pattern to be received at the output terminals only via the difference pattern network when the difference pattern weights are being generated to improve or eliminate the prior undesirable antenna pattern skew. It also reduces power losses in network terminations.

The insertion loss of the present network can be reduced further by providing an unequal signal splitter to distribute the signal weight corresponding to an omnidirectional antenna to the pair of output terminals, one of which is terminated. This, of course, will decrease the power lost to the terminated output terminal, in one of the two modes.

It is the object of the invention to provide an improved antenna beam forming network for generating weights corresponding to a sum antenna pattern having omnidirectional side lobes and for generating weights corresponding to a difference antenna pattern having omnidirectional side lobes wherein the weights are characterized by a minimum of skew.

It is another object of the present invention to provide an improved low insertion loss antenna beam form network of the type described above.

DESCRIPTION OF THE PREFERRED EMBODIMENT

Figure 1:
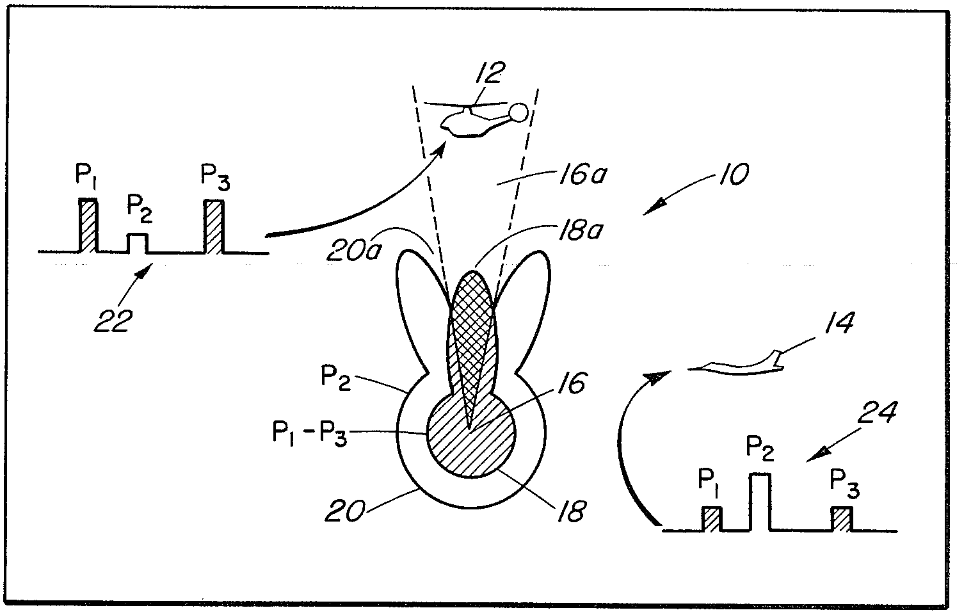
FIG. 1 shows the antenna beam patterns produced by the present invention.

Refer to FIG. 1 where a ground based air traffic control station, represented to be at the common RF phase center 16 of the antenna beam patterns 18 and 20, interrogates a sphere of interest 10. Two aircraft 12 and 14 assumed to have on board transponders are shown operating in sphere of interest 10. The types of interrogation messages transmitted by a ground station are well known to those skilled in the art and need not be described here except to note that what is known in the art as the P1, P2 and P3 pulses are of interest in explaining this invention. As known in the art, the P1, P2 and P3 pulses are transmitted in that order by the ground station on a predetermined schedule. The ideal ground station transmits these pulses so that an aircraft operating in a known small segment, for example, segment 16a of sphere of interest 10, hears the P1 and P3 pulses relatively unattenuated and the P2 pulse greatly attenuated as, for example, illustrated as waveform trace 22. Additionally, the ideal ground station transmits the pulses so that at the same time an aircraft operating in the sphere of interest but outside of the above mentioned small segment hears pulses P1 and P3 attenuated but pulse P2 relative unattenuated, as illustrated by aircraft 14 and waveform trace 24.

The standard technique to accomplish the above is the use of a sum antenna pattern such as pattern 18 (shown shaded) to transmit the P1 and P3 pulses and a difference antenna pattern, such as pattern 20 to transmit the P2 pulse. The terms sum and difference applied to antenna patterns are notations for the two patterns usually employed in monopulse work.

Figure 2:
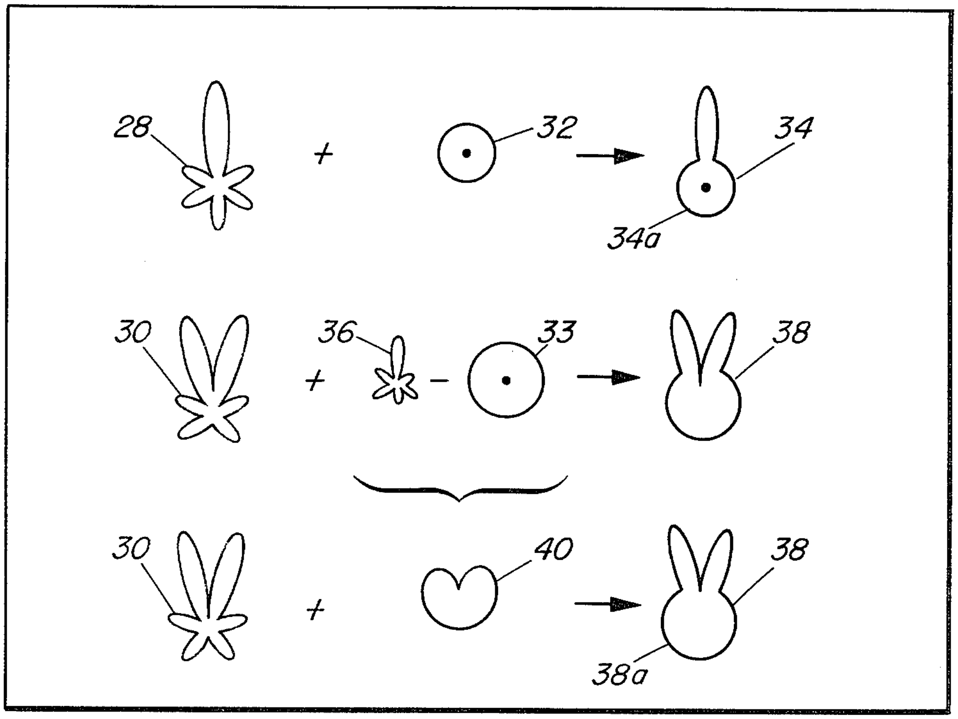
FIG. 2 illustrates the synthesis of the patterns of FIG. 1.

Refer now to FIG. 2 which illustrates the synthesis of the beam patterns of FIG. 1 and which aids in describing the invention. As can be seen, a sum antenna beam pattern 34 having an omnidirectional side lobe 34a is produced by combining a standard sum antenna beam pattern having deep side lobes 28 with an omnidirectional antenna beam pattern 32. Combining a deeply side lobed difference antenna beam pattern 30 with a cardioid antenna beam pattern 40 produces a difference antenna beam pattern 38 having an omnidirectional side lobe 38a. Cardioid antenna beam pattern 40 is produced by combining the omnidirectional antenna beam pattern 33 shifted 180° in phase with an antenna beam pattern 36 which is similar to antenna beam pattern 28 except somewhat attenuated.

Figure 3:
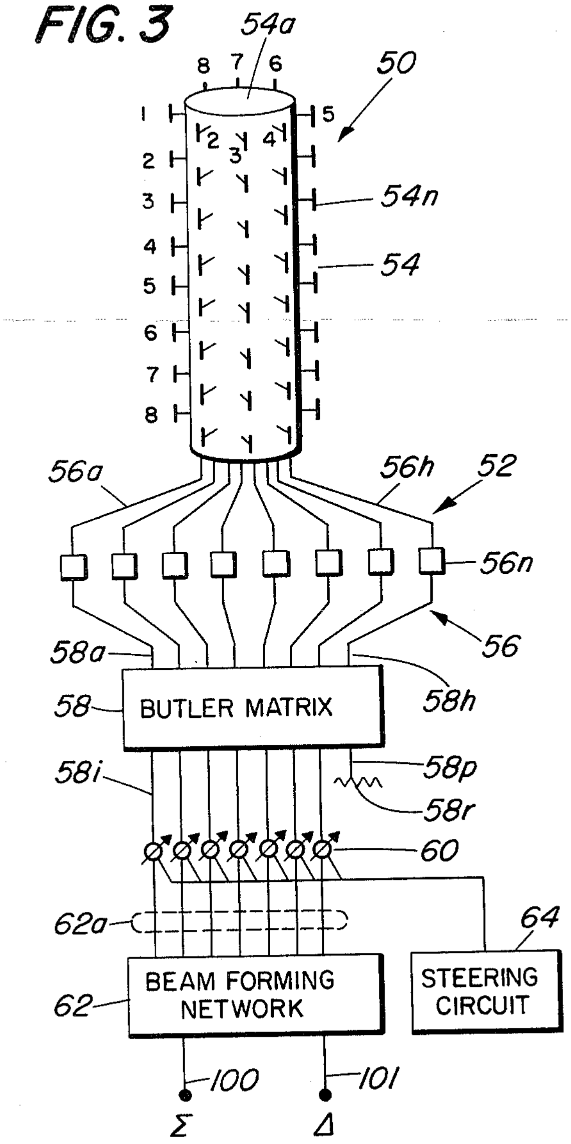
FIG. 3 shows a cylindrical phased array antenna suitable for use in an air traffic control system.

Refer now to FIG. 3 which shows a circular multi-mode antenna array 50 and the feed networks therefor 52. A more common name for the type of antenna arrangement is a Butler matrix fed cylindrical array. As standard in the art, all components used in the arrangement are preferably reciprocal. The arrangement thus has the same properties for both transmit and receive modes of operation. For convenience the following discussion will generally describe the arrangement in the transmit mode.

The arrangement consists of the following main parts: a radiating aperture 54, elevation pattern beam forming networks 56, a Butler matrix 58, phase shifters 60, an azimuth pattern beam forming network 62 and steering circuit 64 for the phase shifters 60.

The radiating aperture 54 of this embodiment consists of 64 dipole elements 54*n* where 8 columns of 8 dipole elements each are equally spaced around a cylinder 54*a* which comprises the dipole ground plane. In a unit actually built cylinder 54*a* had a five inch diameter. The dipoles are positioned vertically and therefore the antenna radiates with vertical polarization.

Each column of 8 dipole elements 54*n* is connected to one of 8 identical elevation pattern beam forming networks 56*n*. Each such network is an 8-way, unequal power divider which has one input and 8 outputs, each of which is connected individually to a different dipole element comprising the associated radiating aperture column. The amplitudes and phases at the 64 various output lines 56*a* to 56*h* will yield the proper distribution to generate the elevation pattern. Power dividers 56 are conventional and need not be further described.

The power divider input terminals are individually connected by lines 58*a* to 58*h* to associated output terminals of Butler matrix 58 which as known to those skilled in the art performs a transformation of signals weighted similarly to those for feeding a linear array, here comprised of 8 signals applied at its input ports 58*a*–58*p*, to weighted signals for a circular array, here comprised of 8 signals present at its output ports 58*a*–58*h*. Butler matrices and their operation are well known to those skilled in the art. Such a matrix is shown in detail at page 11–66 of the Radar Handbook edited by M. I. Skolnik and published in 1970 by the McGraw-Hill Book Company.

Steering the antenna patterns is achieved in the conventional manner by applying a linear phase gradient at the mode inputs, that is, at the input terminals 58*i*–58*p* to the Butler matrix 58. This is accomplished by adjustment of the phase shifters 60. Proper differential adjustment of the various phase shifters from the initial phase synchronizing values will cause the antenna patterns to steer to a mechanical angle that is the same as the differential electrical phase gradient angle across the various phase shifters. In the present embodiment seven phase shifters 60 are used, one for each Butler matrix mode input port, the unused mode input port being terminated with a matched load 58*r*. The phase shifters are identical to one another and are conventional 6-bit digital devices (180°, 90°, 45°, 22.5°, 11.25° and 5.625°) and are the PIN diode type (4-bits reflective type and 2-bits loaded line type). Applying the phase gradient, using the 6-bit shifters illustrated, allows for the azimuth beam to be scanned from 0° to 360° in 5.625° steps for a total of 64 beam positions. The phase shifters 60 are initially set to differing initial phase values as required to make the phase of the far field patterns of the individual circular modes being excited by matrix 58 identical to one another, to within the quantization of the shifters.

The phase shifters are controlled by the steering electronic circuitry 64 which supplies the 7 phase shifters with appropriate 6-bit words for each of the 64 beam positions. The use of digital phase shifters and steering electronics and the embodiments thereof are well known in the art and need not be further described here.

An antenna pattern beam forming network 62 provides at output terminals 62*a* the antenna weights which are steered by phase shifters 60 and transformed to circular array antenna weights for the antenna patterns 34 and 38 of FIG. 2 by Butler matrix 58. Beam forming network 62 has two input ports, a sum pattern port 100 which will cause the weights to produce antenna beam pattern 34 of FIG. 2 to be generated at Butler matrix output terminals 58*a*–58*h*, and a difference pattern port 101 which will cause the weights to produce antenna beam pattern 38 of FIG. 2 to be generated at Butler matrix output terminals 58*a*–58*h*. Antenna pattern beam forming network 62 is described in greater detail with respect to FIG. 4, reference to which figure should now be made.

This network, for the 8 element antenna mentioned above, includes power dividing elements, such as directional couplers 102, 103, 104 and 105, signal splitting elements such as magic Tees 112, 114, 116 and 118, a sum pattern network 108 and a difference pattern network 110. The sum pattern input port 100 is so termed because exciting this port will cause network 62 to generate the signals or weights at output terminals 120-1 to 120-8, which together comprise network output terminals 62*a* seen here and also at FIG. 3, required for an 8 element circular array to produce the sum antenna pattern 34 of FIG. 2 when the weights have been transformed by a Butler matrix. The difference pattern input port 101 is so termed because exciting this latter port will cause network 62 to generate the set of signals or weights at output terminals 120-1 to 120-8 required for the 8 element circular array to produce the difference antenna pattern 38 of FIG. 2 when the weights have been similarly transformed by a Butler matrix. Of course, when steerable phase shifters are interposed between terminals 120-1 to 120-8 and the antenna elements, the various antenna patterns can be steered in accordance with steering signals applied to the phase shifters as known to those skilled in the art and mentioned above. It will be noted that terminal 120-8 is terminated in characteristic impedance 120-8*a*, while Butler matrix of FIG. 3 has its corresponding input port terminated with characteristic impedance 58*r*.

It is known as mentioned above, that for a multielement phased circular array fed from a Butler matrix, exciting one particular matrix input port produces an omnidirectional antenna pattern with zero phase variation in azimuth. This is known in the art as the zero order mode. Thus, returning to FIG. 4, exciting output terminal 120-1 only, which is connected through one of the phase shifters 60 of FIG. 3 to zero order mode Butler matrix input port 58*i*, will provide an omnidirectional antenna pattern such as pattern 32 of FIG. 2. It is also known that exciting all the input ports of a Butler matrix with phase adjusted signals producing in-phase far-field mode patterns whose individual levels are chosen according to a suitable amplitude weighting function such as a Taylor weighting function will produce a low side lobe sum antenna pattern such as pattern 28 of FIG. 2. It is also known that exciting all the input ports of a Butler matrix with signals of whose level is chosen in accordance with a suitable weighting function and where the signals exciting the elements to one side of the array are pairwise differentially 180° out-of-phase with respect to the signals exciting the elements on the other side of the array will produce a difference antenna pattern such as pattern 30 of FIG. 2.

Figure 5:
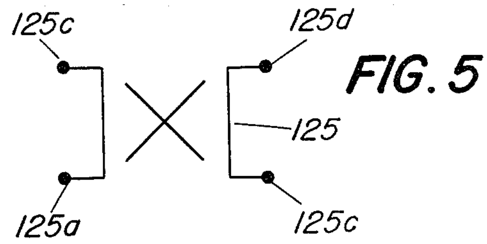
FIG. 5 illustrates the directional coupler convention of FIG. 4.
Figure 4:
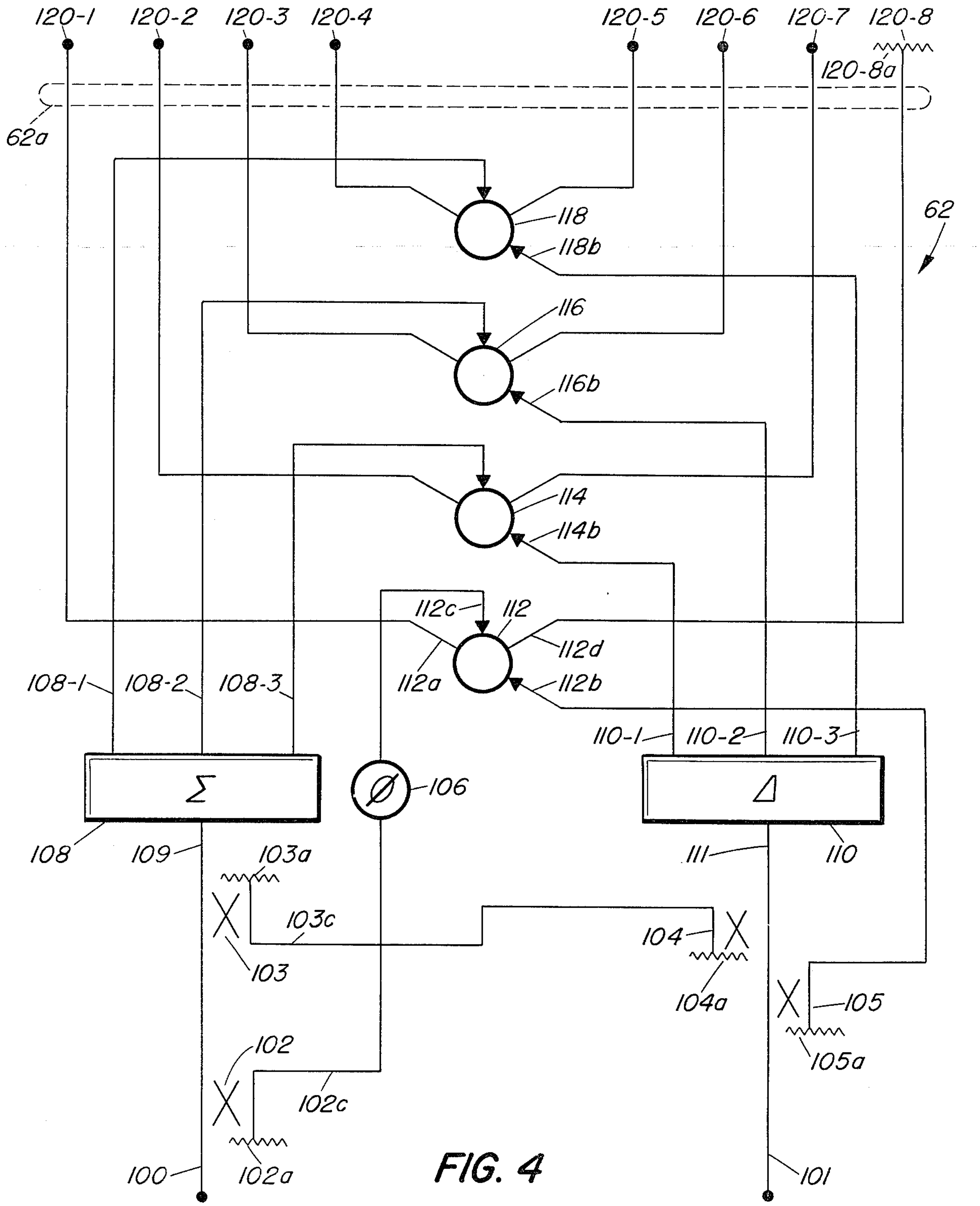
FIG. 4 is a schematic diagram of an RF feed network and illustrates the invention.

Before proceeding with this description of FIG. 4 it is instructive and helpful to understand the convention used in illustrating the hybrids and directional couplers thereof. A representative hybrid is shown in FIG. 5, reference to which should be made. A directional coupler 125 is shown having a coupling factor C, input terminals 125*a* and 125*b* and output terminals 125*c* and 125*d*. Exciting input terminal 125*a* distributes power according to coupling factor C to output terminal 125*d* and (1-C) to 125*c*. In like manner exciting input terminal 125*b* distributes power according to coupling factor C to output terminal 125*c* and (1-C) to 125*d*. There is insignificant coupling between input terminals.

Figure 6:
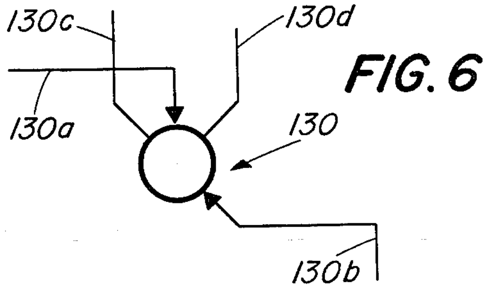
FIG. 6 illustrates the hybrid convention of FIG. 4.

Refer now to FIG. 6 which illustrates a typical signal splitter or magic Tee in the form of hybrid 130 having a coupling factor C and input terminals 130*a* and 130*b* and output terminals 130*c* and 130*d*. Exciting either input terminal distributes power according to coupling factor C and (1-C) to the output terminals. If input terminal 130*a* is excited the power at the output terminals is in-phase. If input-terminal 130*b* is excited the signal at output terminal 130*d* is shifted 180° with respect to the signal at output terminal 130*c*. Normally these are 3 dB signal splitters so that the input power is equally divided at the output terminals. However, it is possible to construct unequal power splitters and the details of such an unequal power splitter will be disclosed below.

Returning now to FIG. 4, it is first desired to generate at output terminals 120-1 to 120-8 the linear array weights to produce antenna pattern 34 of FIG. 2. This is done by superimposing at the output terminals the weights to produce sum pattern 28 of FIG. 2 simultaneously with the weights to produce omnipattern 32. From the earlier discussion it is known that proper weights to produce the sum pattern can be selected by consideration of an appropriate weighting function. Considering, in particular, a Taylor weighting function, the proper weights for the sum pattern are found to be:

| Terminal | dB | Phase |
|---|---|---|
| 120-1 | 0.0 | 0.0 |
| 120-2 | −1.32 | 0.0 |
| 120-3 | −5.53 | 0.0 |
| 120-4 | −13.27 | 0.0 |
| 120-5 | −13.27 | 0.0 |
| 120-6 | −5.53 | 0.0 |
| 120-7 | −1.32 | 0.0 |

Next, remember that excitation of only one output terminal which feeds the zero order mode input to the Butler matrix produces the desired omnidirectional pattern. Hybrid 112 excites this desired output terminal 120-1, and terminal 120-8 which is terminated by impedance 120-8*a*. One must now consider the desired relative strengths of the antenna field patterns 28 and 32 of FIG. 2 to produce the omnidirectional field pattern 32 which when added to antenna field pattern 28 will result in antenna field pattern 34. An omnidirectional field strength −20 dB with respect to the main beam field strength of field pattern 28 is typical. It is desirable that the fields be added in phase quadrature to minimize ripple on the omnidirectional portion of the pattern. Adding the two subsets of weights corresponding to a sum pattern and omnidirectional pattern respectively in phase quadrature give the following set of weights to produce antenna field pattern 34:

| Terminal | dB | Phase |
|---|---|---|
| 120-1 | 0.0 | +22.0 |
| 120-2 | −1.98 | 0.0 |
| 120-3 | −6.19 | 0.0 |
| 120-4 | −13.93 | 0.0 |
| 120-5 | −13.93 | 0.0 |
| 120-6 | −6.19 | 0.0 |
| 120-7 | −1.98 | 0.0 |

Figure 7:
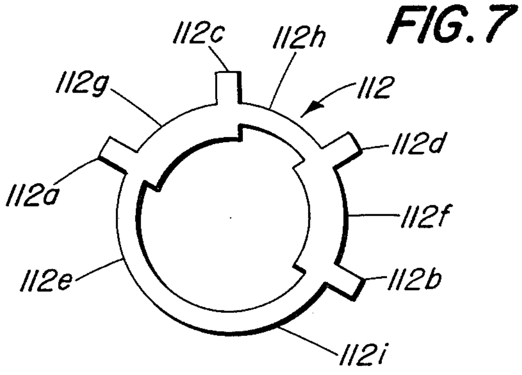
FIG. 7 shows a stripline unequal split ring hybrid.

The relative weights for terminals 120-2 through 120-7 are generated, when sum pattern input port 100 is excited, in sum pattern network 108 and then evenly divided by hybrids 114, 116 and 118 which each have a −3 dB coupling factor so that power is equally divided to their output ports. The weight for terminal 120-1 is generated by coupler 102 followed by a +22° phase shifter 106 and distributed to terminals 120-1 and 120-8 by hybrid 112. Of course, since terminal 120-8 is terminated by resistor 120-8*a* any power distributed to that terminal is lost. It is thus wasteful of sum mode energy to use a −3 dB hybrid for hybrid 112. In the present embodiment hybrid 112 has a −5.14567 dB coupling factor as determined by also considering losses in the difference mode. Although −3 dB hybrids such as hybrids 114, 116 and 118 are well known in the art, unequal split hybrids are also known as was mentioned above. For example, unequal split 1.5 wavelength hybrids are described by Harlan Howe at pages 92–94 of reference book "Stripline Circuit Design" published by Artech House, Inc. where a hybrid with −6 dB coupling is particularly described. In order to provide unequal power split between the two output ports, various portions of the ring comprising the hybrid are designed to have different impedance levels. The unequal split hybrid described in the above mentioned text has a somewhat different coupling factor and the phasing is opposite to what is required here. FIG. 7 shows the 1.5 wavelength unequal split ring hybrid described in the text as modified to provide the performance characteristics required for this embodiment. Referring to FIG. 7, hybrid 112 is comprised of stripline ring 112*e* having ring portions 112*f*, 112*g*, 112*h* and 112*i*, input ports 112*b* and 112*c* and output ports 112*a* and 112*d*. The input and output ports are also labeled in FIG. 4 for reference. Ring portions 112*f* and 112*g* are each 60.010366 ohm stripline while ring portions 112*e* and 112*h* are each 90.417918 ohm stripline. There are other devices which can perform the same function as hybrid 112. For example, stepped asymmetric, commensurate-length or tapered-line, coupled line structures are known in the literature which can perform this function. However, these other devices have rather long electrical insertion length and hence are not preferred for this embodiment. Another alternative to hybrid 112 is a backward wave, symmetric −90° hybrid which can be substituted for hybrid 112 if a +90° phase shifter is included in line 105*b* of FIG. 4.

Returning to FIG. 4, power input to phase shifter 106 is obtained from directional coupler 102 which couples power from sum pattern input terminal 100. It should be noted that terminal 100 is not coupled to terminal 101 or difference pattern network 110, thus, energizing sum pattern input terminal 100 causes beam forming network 62 to generate the proper weight for a sum pattern at terminals 120-1 through 120-7.

Figure 8:
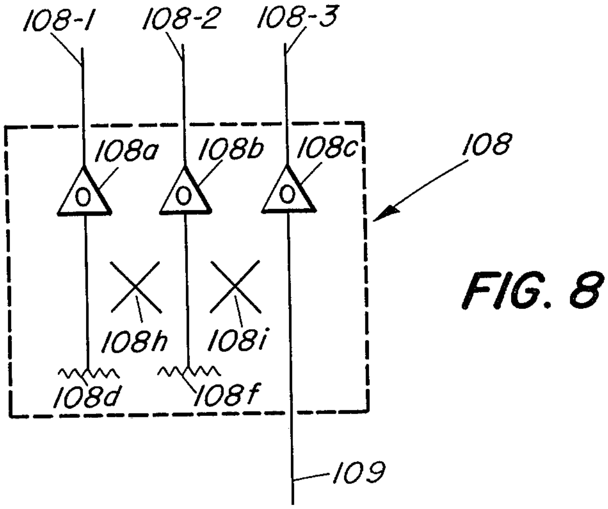
FIG. 8 shows the sum pattern network of FIG. 4 in greater detail.

The suitable sum pattern network 108, seen in greater detail at FIG. 8, is a 3-way unequal power divider having directional couplers **108*h* and 108*i*. Input terminal 109 is connected through fixed phase shifter 108*c* to output terminal 108-3 and through the directional couplers 108*i* and 108*h* to the other output terminals 108-2 and 108-1, respectively. The second directional coupler input terminals are terminated in the characteristic impedances 108*d* and 108*f* to eliminate any power reflections therefrom. The fixed phase shifters 108*a* and 108*b* as well as fixed phase shifter 108*c*** are provided to obtain the proper signal phasing listed in the table immediately below. The coupling factors of the various directional couplers are, of course, designed to provide the desired output signal levels.

| Terminal | dB | Phase |
|---|---|---|
| 108-1 | −11.95 | 0.0 |
| 108-2 | −4.21 | 0.0 |
| 108-3 | 0.0 | 0.0 |

Returning to FIG. 4, the sum beam pattern 34 of FIG. 2 is thus produced, in appropriate array weight format at output terminals 120-1 to 120-8, merely by exciting network input terminal 100 since directional coupler 103 effectively blocks any input power from appearing on line 101 as previously discussed.

The difference beam pattern 38 of FIG. 2 is produced, in array weight format at output terminals 120-1 to 120-8, by exciting network input terminal 101. In this case power on terminal 101 is divided and a portion fed into terminal 109 through directional couplers 104 and 103. From the above discussion it should now be obvious that by so exciting terminal 109 the elements for a sum beam pattern identical to pattern 28 are produced in appropriate array weight format at output terminals 120-2 to 120-7 except for the relative field strength. The reduced amplitude sum beam pattern 36 of FIG. 2 having the appropriate field strength to produce the notch in the cardioid is easily set by the design of directional couplers 103 and 104. Of course, the omnidirectional mode or weight for the sum beam is not generated by exciting terminal 109. Instead, power on input terminal 101 is further divided by directional coupler 105 and fed into terminal **105*b*, which is connected into hybrid 112 at input port 112*b*. The amplitude consists of the super position of a relatively weak zero-phase component from the reduced amplitude sum beam, and the larger negative omnidirectional signal for 33 in FIG. 2. The net resultant is negative. Reviewing the convention of FIG. 6, it is seen that exciting terminal 105*b* causes terminal 126-1 to be excited 180° out of phase with the input, providing the desired negative polarity. The net effect of this excitation and that of the sum divider 108 is to produce the cardioid pattern 40 of FIG. 2**.

The remaining power on input terminal 101 excites input terminal 111 of difference pattern network 110. It is this latter network which generates the signals for producing difference pattern 30 of FIG. 2. By considering an appropriate weighting function, here the Taylor weighting function modulated by a sine wave, the power distribution of difference pattern network 110 can be determined. Network 110, like network 108 of FIG. 8, consists of two directional couplers and three fixed phase shifters. In this embodiment the following power distribution was used to produce difference antenna beam pattern 38 of FIG. 2 where the omnidirectional side lobe was 15 dB down from the maximum signal envelope and normalizing the power on terminal 110-1:

| Terminal | dB | Phase |
|---|---|---|
| 110-1 | 0.0 | 0.0 |
| 110-2 | −0.72 | 0.0 |
| 110-3 | −12.15 | 0.0 |

The power distributed by directional couplers 103, 104 and 105 is the following, where power on terminal 111 is normalized:

| Terminal | dB | Phase |
|---|---|---|
| 109 | −18.95 | 0.0 |
| 105b | −6.16 | 0.0 |
| 111 | 0.0 | 0.0 |

The resulting weights at terminals 120-1 to 120-7, with the signal on terminal 120-7 normalized, is as follows to produce difference field pattern 28 of FIG. 2:

| Terminal | dB | Degree |
|---|---|---|
| 120-1 | −6.52 | 180 |
| 120-2 | −2.27 | 180 |
| 120-3 | −2.56 | 180 |
| 120-4 | −14.45 | 180 |
| 120-5 | −12.13 | 0.0 |
| 120-6 | −1.05 | 0.0 |
| 120-7 | 0.0 | 0.0 |

It can be seen that the connection of terminals **105*b*, 110-1, 110-2 and 110-3, respectively, to hybrid input terminals 112*b*, 114*b*, 116*b* and 118*b* provides the aforementioned 180° phase shift between the weights of the first four output terminals 120-1 to 120-4** and the other output terminals to produce a difference field pattern.

It should be noted in FIG. 4 that power coupled from input terminal 101 to terminal 109 via directional couplers 103 and 104 is distributed by the sum pattern network 108 to hybrids 118, 116 and 114 but no power is coupled into port **112*c* of hybrid 112. The only power coupled into hybrid 112 in this mode of operation is at input port 112*b* which is received via line 105*b* from directional coupler 105. In the prior art the sum pattern network included an additional coupler which supplied weighted power to port 112*c* of hybrid 112. In that case when the difference pattern input terminal 101 was energized hybrid 112 received power via both input ports 112*c* and 112*d***. This caused an undesirable slight skewing of the antenna weights. The present invention, of course, eliminates that problem.

Figure 9:
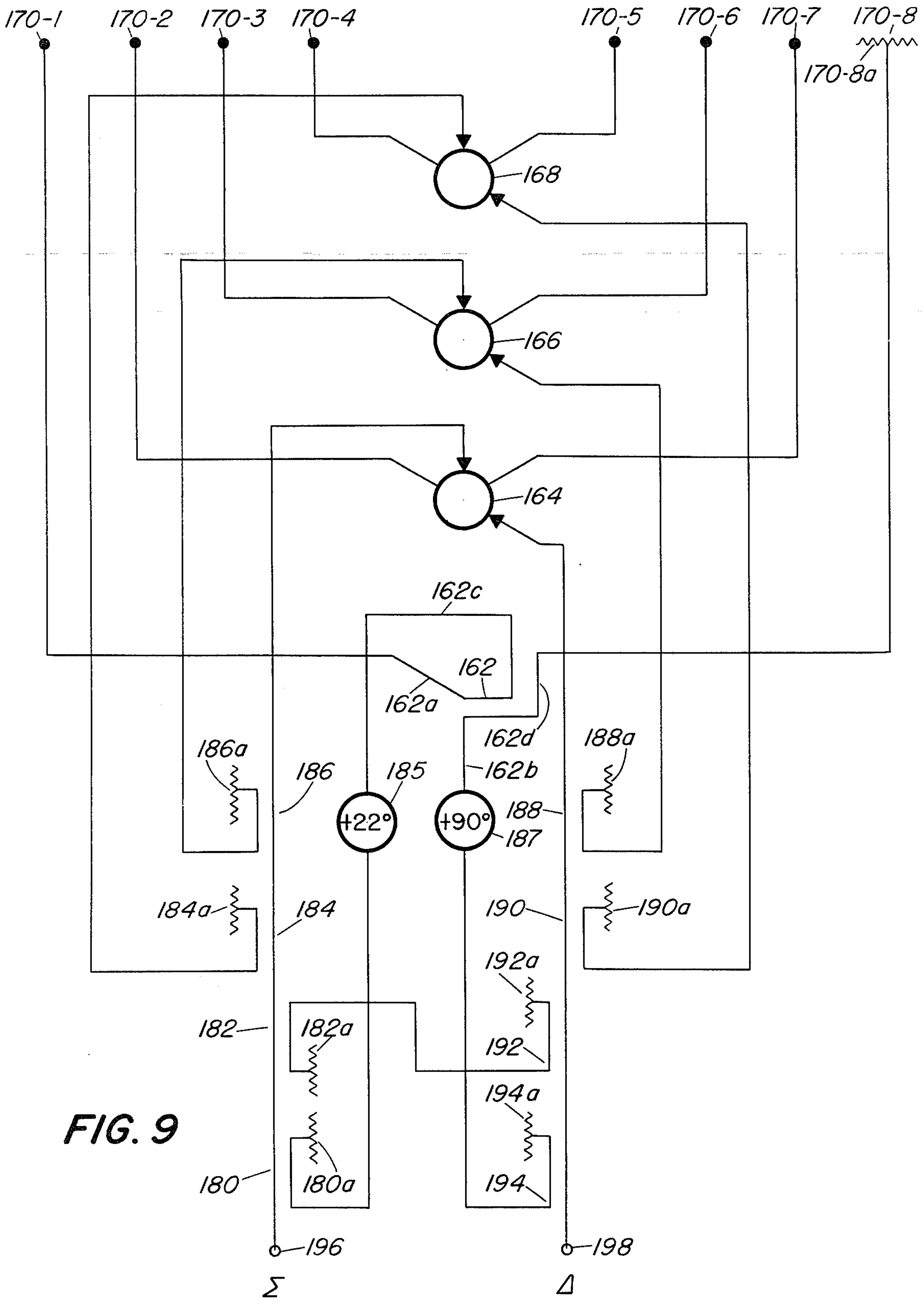
FIG. 9 is a schematic diagram of a slightly different form of an RF feed network.

An alternative version of the invention is illustrated in FIG. 9, using backward wave couplers. Referring to FIG. 5, the convention for a backward wave coupler is as follows. Power input at terminal **125*a*, for example, is split according to power coupling factor C to terminal 125*b* and (1-C) to terminal 125*c*. There is insignificant power coupled to terminal 125*d*, the isolated port. Referring now to FIG. 9, hybrids 164, 166 and 168 can be identical to hybrids 114, 116 and 118, respectively, of FIG. 4, that is, they are −3 dB magic tees. Hybrid 112 of FIG. 4 is replaced in this version of the invention by the backward wave, symmetric −90° hybrid 162 and +90° phase shifter 187, a replacement which was discussed earlier. A difference pattern input terminal 198 is unidirectionally coupled to a sum pattern power division input terminal 199 via backward wave couplers 192 and 182. That is, power on terminal 198 is thereby coupled to terminal 199 but a power signal impressed at terminal 196 will not be coupled to terminals 198 or 200. Backwave couplers 184 and 186 are equivalent to sum pattern network 108 of FIG. 4, while backward wave couplers 188 and 190 are equivalent to difference pattern generator 110 of FIG. 4** except, of course, backward wave couplers are used here. Directional couplers constructed with coax or in stripline are normally backward wave devices.

The operation and function of the device of FIG. 9 is identical to or so similar to that of the device of FIG. 4 that one skilled in the art should now find further explanation thereof unnecessary. Briefly, upon energizing sum pattern terminal 196 linear weights equivalent to the sum pattern 34 of FIG. 2 will be generated at output terminals 170-1 through 170-7 and upon energizing difference pattern terminal 198 linear weights equivalent to the difference pattern 38 of FIG. 2 will be generated at output terminals 170-1 through 170-7. It is the convention not to show the x between the two halves of the backward wave coupler and this convention is used in FIGS. 9 and 10.

Figure 10:
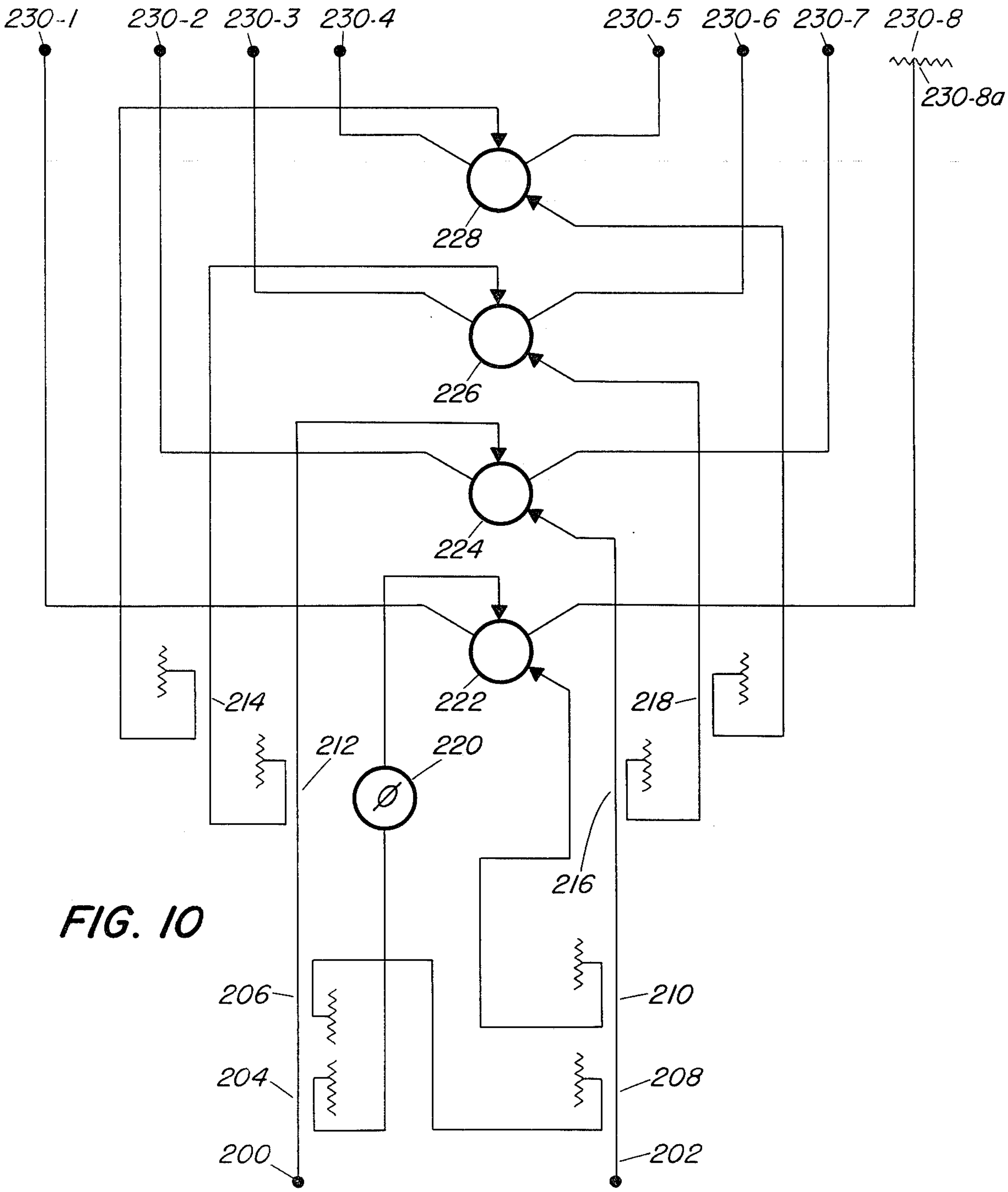
FIG. 10 is a schematic diagram of another form of the invention.

Refer now to FIG. 10 which is the schematic of another form of the invention using backward wave couplers 204, 206, 208, 210, 212, 214, 216 and 218 and hybrids 222, 224, 226 and 228. It should be clear that except for the use of backward wave couplers the schematic here is identical in function to that of FIG. 4 where cascaded couplers 212 and 214 comprise the sum pattern network and cascaded couplers 216 and 218 comprise the difference pattern network. As before, a +22 degree phase shifter 220 is provided in the line coupling terminal 200 and hybrid 222. Energizing sum input terminal 200 generates the appropriate sum antenna pattern weights at output terminals 230-1 to 230-8, while energizing difference input terminal 202 generates the appropriate difference antenna pattern weights at the same output terminals. This schematic has as its advantage a particularly compact physical realization in three layer overlay stripline, without requiring any conductor transitions between layers, or crossovers of conductors. This design has been built in a 10 by 7.6 inch version with a stripline sandwich consisting of two 0.062 inch ground plane boards with a 0.015 inch center shim.

As was mentioned earlier, it is possible to minimize the insertion loss of the inventive circuit by an unequal hybrid, such as hybrid 162 of FIG. 9 to provide less sum power to the terminated output terminal, for example, terminal 170-8. In that embodiment it was desired to make the insertion loss equal whether input terminal 196 or 198 was energized. The assumed lossless directional couplers and hybrids, in that case, had the following coupling factors and the insertion loss with either input terminal energized was 0.94 dB.

| Directional Coupler or Hybrid | Coupling Factor (dB) |
|---|---|
| 180 | −3.88 |
| 182 | −9.26 |
| 184 | −13.54 |
| 186 | −5.61 |
| 188 | −3.39 |
| 190 | −14.96 |
| 192 | −10.13 |
| 194 | −7.44 |
| 162 | −5.15 |
| 164 | −3.0 |
| 166 | −3.0 |
| 168 | −3.0 |

In some applications it is desired to reduce the insertion loss of one mode with respect to the other. This was the case for the circuit of FIG. 10 where the insertion loss with sum input terminal 200 energized is 1.72 dB and the loss with difference input terminal 202 energized is 0.52 dB. The original network of the copending application had a similar loss unbalance in that the sum mode loss was 1.90 dB, while the difference mode loss was 1.27 dB. It will be noted that the new network exhibits lower losses in both modes. The directional couplers and hybrids have the following coupling factors:

| Directional Coupler or Hybrid | Coupling Factor (dB) |
|---|---|
| 204 | −3.22 |
| 206 | −7.73 |
| 212 | −5.13 |
| 214 | −8.42 |
| 208 | −12.10 |
| 210 | −8.87 |
| 216 | −3.22 |
| 218 | −11.73 |
| 222 | −3.01 |
| 224 | −3.01 |
| 226 | −3.01 |
| 228 | −3.01 |

Having described the embodiments of my invention, various modifications and alterations thereof should now be obvious to one skilled in the art. Accordingly, the invention is to be limited only by the true spirit and scope of the appended claims.

The invention claimed is:

1. A beam forming network for an antenna array for generating antenna weights and including N output terminals, one of which is terminated by a characteristic impedance, the antenna weights being generated at the other output terminals, comprising:

a first input terminal;

a second input terminal;

N/2 signal splitters having first and second input ports and first and second output ports connected respectively to individual ones of said output terminals, said signal splitters being characterized in that a signal applied to said first input port is split according to a predetermined coupling factor to said first and second output ports with the resultant signals at said first and second output ports essentially in phase with one another and in that a signal applied to said second input port is split according to the predetermined coupling factor to said first and second output ports with the resultant signals at said first and second output ports essentially 180° out of phase with respect to one another;

a sum pattern network having an input port connected to said first input terminal and (N/2 −1) output ports connected respectively to the first input ports of all but a first of said signal splitters;

a difference pattern network having an input port connected to said second input terminal and (N/2 −1) output ports connected respectively to the second input ports of all but said first of said signal splitters;

means for coupling said first input terminal to the first input port of said first of said signal splitters and including means for shifting the phase of a signal coupled between said first input terminal and said first signal splitter by a predetermined phase angle;

means unidirectionally coupling said second input terminal to the input port of said sum pattern generator while not coupling the input port of said sum pattern generator to said second input terminal; and, means coupling said second input terminal and the second input port of said first signal splitter whereby excitation of said first input terminal generates weights corresponding to a sum antenna pattern having omnidirectional side lobes at said output terminals and excitation of said second input terminal generates weights corresponding to a difference antenna pattern having omnidirectional sidelobes at said output terminals.

2. The beam forming network of claim 1 wherein said first signal splitter has a coupling factor of about −5.15 dB and whose first output port is connected to the terminated output terminal.

3. The beam forming network of claim 2 wherein the coupling factors of the other signal splitters is about −3 dB.

4. The beam forming network of claim 2 or 3 wherein said first phase splitter comprises a 1.5 wavelength unequal ring hybrid.

5. The beam forming network of claim 2 or 3 wherein said first phase splitter comprises a stripline 1.5 wavelength unequal ring hybrid, the impedance of the ring between the first input port and the second output port and between the second input port and the first output port being about 60 ohms and the impedance of the ring between the first input port and the first output port and between the second input port and the second output port being about 90.4 ohms.

6. The beam forming network of claim 1, 2 or 3 wherein said first signal splitter comprises a backward wave symmetric −90° hybrid and wherein said means coupling said second input terminal and the second input port of said first signal splitter includes means for shifting the phase of a coupled signal +90°.

7. The beam forming network of claim 1 where each said signal splitter has a coupling factor of about −3 dB.

* * * * *